(12) United States Patent
Cifra

(10) Patent No.: US 12,177,068 B2
(45) Date of Patent: Dec. 24, 2024

(54) SYSTEM AND METHOD FOR EFFICIENT DATA MOVEMENT IN AN ORCHESTRATED DISTRIBUTED MEASUREMENT APPLICATION

(71) Applicant: National Instruments Corporation, Austin, TX (US)

(72) Inventor: Christopher George Cifra, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 18/177,611

(22) Filed: Mar. 2, 2023

(65) Prior Publication Data

US 2023/0283516 A1 Sep. 7, 2023

Related U.S. Application Data

(60) Provisional application No. 63/316,250, filed on Mar. 3, 2022.

(51) Int. Cl.
*H04L 41/5054* (2022.01)
*H04L 41/0806* (2022.01)
*H04L 61/4511* (2022.01)

(52) U.S. Cl.
CPC ...... *H04L 41/0806* (2013.01); *H04L 61/4511* (2022.05)

(58) Field of Classification Search
None
See application file for complete search history.

(56) References Cited

U.S. PATENT DOCUMENTS

| | | | |
|---|---|---|---|
| 11,115,336 B2 * | 9/2021 | Sabella | H04L 47/822 |
| 2017/0126512 A1 * | 5/2017 | Seed | H04L 67/51 |
| 2021/0105193 A1 * | 4/2021 | Chong | H04L 41/0896 |
| 2021/0241355 A1 * | 8/2021 | Low | H04L 9/3263 |
| 2021/0263779 A1 * | 8/2021 | Haghighat | G06F 9/5061 |
| 2021/0390029 A1 * | 12/2021 | Zhao | H04L 41/5054 |

* cited by examiner

*Primary Examiner* — Christopher B Robinson
(74) *Attorney, Agent, or Firm* — Harness, Dickey & Pierce, PLC

(57) ABSTRACT

A method of orchestrating measurements in a measurement system includes configuring a first service with a first configuration for acquiring measurement data by an orchestrator. The method also includes receiving a moniker generated by the first service in response to being configured that represents the first configuration. The moniker includes a location of the first service and an identifier of the first configuration. The method also includes transferring the moniker to a second service configured to establish communication with the first service based on the location, consume the measurement data acquired by the first service using the first configuration and transmitted in response to receiving the identifier from the second service, and generate a result in response to receiving the measurement data from the first service. The method further includes receiving the result from the second service.

20 Claims, 9 Drawing Sheets

SYSTEM AND METHOD FOR EFFICIENT DATA MOVEMENT IN AN ORCHESTRATED DISTRIBUTED MEASUREMENT APPLICATION

CROSS-REFERENCE TO RELATED APPLICATIONS

This application claims the benefit of U.S. Provisional Patent Application No. 63/316,250, filed Mar. 3, 2022, entitled "SYSTEM AND METHOD FOR EFFICIENT DATA MOVEMENT IN AN ORCHESTRATED DISTRIBUTED MEASUREMENT APPLICATION", the disclosure of which is hereby incorporated by reference in its entirety.

BACKGROUND OF THE INVENTION

Modern electronics manufacturing and assembly systems may include an ever-increasing number of distributed services to perform test and measurement operations. Despite the progress made in the area of orchestrating such distributed services, there is a need for more efficient methods and systems for collecting data and generating results.

SUMMARY OF THE INVENTION

Various embodiments are described related to efficient data movement in an orchestrated distributed measurement application. In some embodiments, a computer-implemented method of orchestrating measurements in a measurement system comprising a first service for acquiring measurement data, a second service for consuming the measurement data and producing a result, and an orchestrator for configuring the measurement system is described. The computer-implemented method may comprise configuring, by the orchestrator and using a configuration Application Programming Interface (API), the first service with a first configuration. The method may further comprise receiving, by the orchestrator from the first service, a moniker that represents the first configuration, wherein the moniker is generated by the first service in response to being configured by the orchestrator. The moniker may comprise a location of the first service. In some embodiments, the second service is configured to establish communication with the first service based on the location of the first service. The moniker may further comprise an identifier of the first configuration. In some embodiments, the first service is configured to acquire the measurement data using the first configuration, and transmit the measurement data to the second service, in response to receiving the identifier from the second service via the established communication. The method may further comprise transferring the moniker to the second service. The method may further comprise receiving the result from the second service, wherein the result is generated by the second service in response to receiving the measurement data from the first service.

In some embodiments, the measurement system is distributed across compute nodes connected via a communication network. In some embodiments, the orchestrator is remote to at least one of the first service or the second service. In some embodiments, receiving the identifier from the second service via the established communication is independent of the first service being configured by the orchestrator. In some embodiments, the identifier of the first configuration includes parameters of the first configuration.

In some embodiments, the identifier of the first configuration includes a location of the first configuration in the first service.

In some embodiments, at least one of acquiring the measurement data or transmitting the measurement data comprises at least one of acquiring a subset of data in more than one batch using the identifier of the first configuration from the moniker or transmitting the subset of data in more than one batch using the identifier of the first configuration from the moniker. In some embodiments, the location includes at least one of a Domain Name Service (DNS) lookup, a raw Internet Protocol (IP) address, a protocol address, or a service directory.

In some embodiments, the measurement system comprises a plurality of services including the second service and at least one more service for consuming the measurement data and producing at least one more result, and configuring the first service includes providing information about the plurality of services to the first service. The method may further comprise transferring the moniker from the orchestrator to the at least one more service; and receiving the at least one more result from the at least one more service, wherein the at least one more result is generated by the at least one more service in response to receiving the measurement data from the first service using the location and the identifier of the moniker. In some embodiments, the second service is unable to configure the first service. In some embodiments, the second service is unable to establish the communication with the first service without the location of the first service from the moniker.

In some embodiments, a method of constructing a measurement system with moniker-based data flow is described. The method may comprise constructing a measurement system comprising a first service for acquiring measurement data, a second service for consuming the measurement data, and an orchestrator for configuring the measurement system. Configuring the measurement system may comprise configuring, by the orchestrator, the first service using a configuration application programming interface (API). Configuring the measurement system may comprise generating and returning to the orchestrator, by the first service, a moniker for representing the configuration. In some embodiments, the moniker comprises a location of the first service and an identifier for the configuration. Configuring the measurement system may comprise transferring, by the orchestrator, the moniker to the second service. Configuring the measurement system may comprise locating, by the second service, the first service based on the location of the first service. The method may further comprise transferring, by the second service, the identifier for the configuration to the first service. The method may further comprise acquiring, in response to receiving the identifier for the configuration, the measurement data based on the configuration. The method may further comprise transferring, by the first service, the measurement data to the second service.

Numerous benefits are achieved by way of the present invention over conventional techniques. For example, embodiments of the present invention can reduce unnecessary latency and consumption of system resources by reducing the number of data transmissions between distributed services. These and other embodiments of the invention, along with many of its advantages and features, are described in more detail in conjunction with the text below and corresponding figures.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF SPECIFIC EMBODIMENTS

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Certain embodiments relate to systems and methods for configuring and operating test and measurement systems, and more particularly, to the efficient use of data monikers to provide efficient data movement and processing across distributed services. Test and measurement systems may include a client service that receives input from an operator such as instructions to perform one or more test measurements and/or to process measurement data into useable results. Test and measurement systems may also include multiple distributed services to physically collect data from devices under test (DUTs), process the data, and generate the result for the client service. Data collected and/or produced by one service may be used by one or more other services to produce subsequent data for additional processing and/or to generate the final result. In some cases, the client service may configure each of the distributed services as well as broker the flow of data from service to service. However, such an arrangement may lead to an unnecessary increase in latency due to the amount of data transmissions. This may also cause the client service to consume unnecessary processing bandwidth and a separate data by the operator.

These and other challenges may advantageously be avoided or minimized by enabling the distributed services to directly communicate with and pass data to others of the distributed services. The use of data monikers to represent configurations, as will be described further below, can enable the system to perform measurements with no or reduced involvement on the part of the client service after each of the distributed services has been configured.

Figure 1:
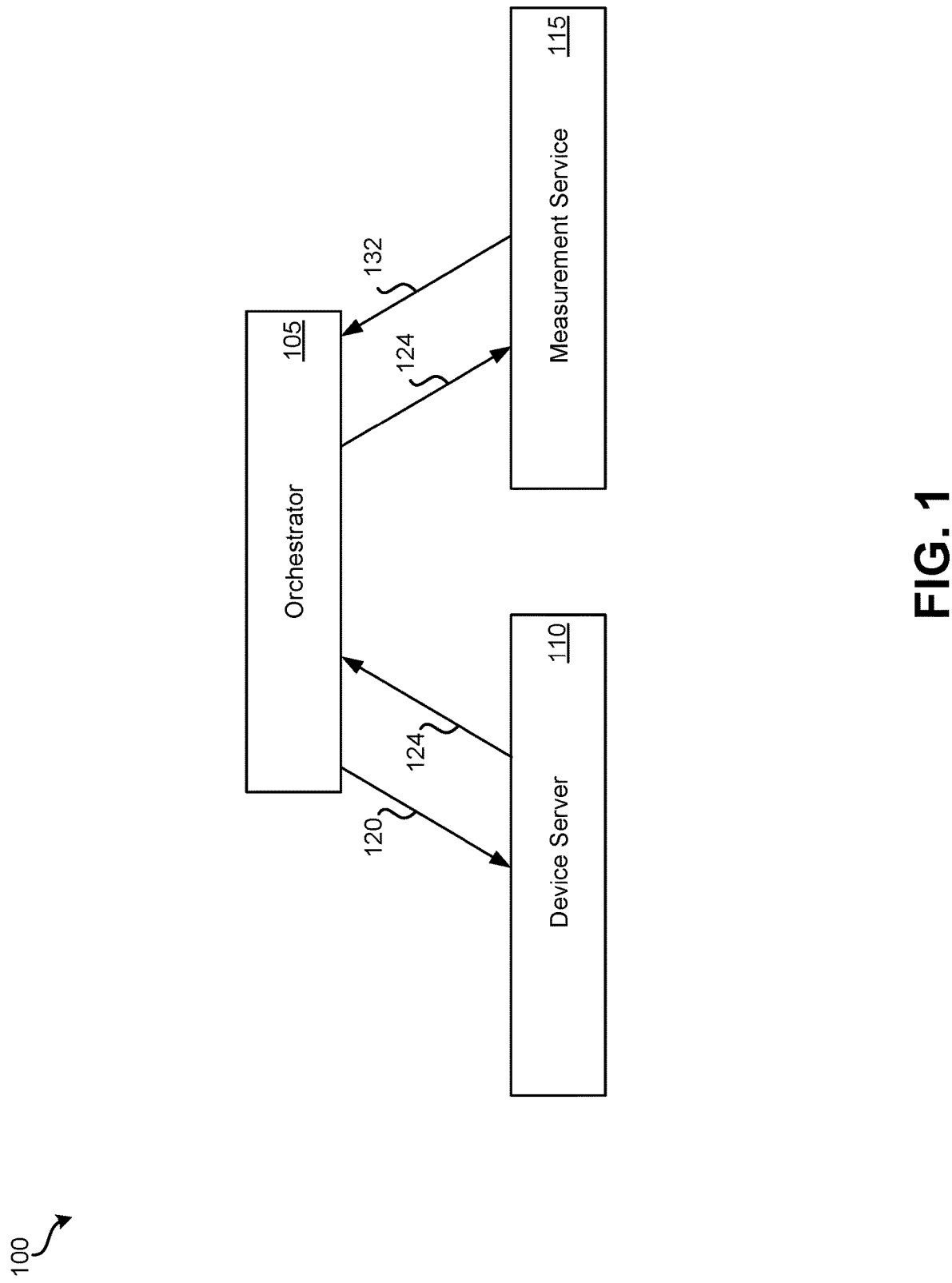
FIG. 1 illustrates the configuration and flow of data within a test and measurement system according to some embodiments.

FIG. 1 illustrates the configuration and flow of data within a test and measurement system 100 according to some embodiments. Test and measurement system 100 may include orchestrator 105, device server 110, and measurement service 115. Test and measurement system 100 may be a collection of services used to perform a measurement of a device under test (DUT). This may include setting up, stimulating, and acquiring data via a data acquisition device, analyzing the acquired signals, and producing a result. For example, test and measurement system 100 may be a test system used to test electronic devices during a manufacturing and/or assembly process.

Orchestrator 105 may be a service responsible for configuring other services within test and measurement system 100, such as device server 110 and/or measurement service 115. As described herein, a service may be a computer application which communicates with other services via a communication application programming interface (API). Orchestrator 105 may also be configured to coordinate the flow of data between services within test and measurement system 100.

In some embodiments, orchestrator 105 is configured to perform higher level functions and/or processing compared to other services, such as device server 110 and/or measurement service 115. For example, orchestrator 105 may be configured to analyze and generate various types of outputs using data collected from device server 110 and/or measurement service 115. Additionally, or alternatively, orchestrator 105 may be configured to collect data from one service, such as device server 110, and provide the collected data to another service, such as measurement service 115, for additional processing.

For example, as illustrated, orchestrator 105 may transmit instructions 120 to device server 110 to perform one or more actions specific to device server 110. The one or more actions may include a specific set of operations as defined by an API. For example, device server 110 may be configured to acquire measurement data from an external source, such as a test tool device, local memory, a database, a file system, or a similar source of measurement data. Measurement data may include one or more types of data corresponding to a physical phenomenon or a transformation of a physical phenomenon. For example, measurement data may include electrical circuit level measurements such as voltages, currents, resistances, or similar data related to electrical components. As another example, measurement data may include logic level test results such as binary outputs in response to one or more binary inputs. In some embodiments, device server 110 controls one or more test tool devices used to measure and/or collect measurement data from physical objects, such as electronic devices. For example, device server 110 may control the operation of a programmable oscilloscope, or other measurement device.

In some embodiments, device server 110 is configured to collect measurement data according to one or more configuration parameters included in instructions 120 and/or as defined by an API. The one or more configuration parameters may alter how device server 110 collects and/or measures data. For example, configuration parameters may indicate a sampling rate at which to take one or more measurements. As another example, configuration parameters may include one or more input values used to stimulate a measured response from an electrical component.

As further illustrated, device server 110 may transmit intermediate results 124 to orchestrator 105. Intermediate results 124 may include measurement data, as described above, as collected or measured in response to instructions 120. Intermediate results 124 may be transmitted to orchestrator 105 in response to device server 110 receiving instructions 120. For example, instructions 120 may be part of a synchronous method call wherein device server 110 is configured to provide requested measurement data in response to a remote method call from another service, such as orchestrator 105. Additionally, or alternatively, orchestrator 105 may retrieve intermediate results 124 from device server 110 as part of a separate process. For example, instructions 120 may be part of an asynchronous method call wherein device server 110 is configured to perform one or more actions in response to receiving instructions 120 and optionally store one or more results of the actions in a location in memory. Orchestrator 105 may then invoke a separate synchronous method to retrieve intermediate results 124.

In some embodiments, after receiving intermediate results 124 from device server 110, orchestrator 105 may pass intermediate results 124 to measurement service 115 for additional processing. For example, after receiving intermediate results 124 from device server 110, orchestrator 105 may transmit some or all of intermediate results 124 to measurement service 115. In some embodiments, measurement service 115 is configured to perform one or more actions on intermediate results 124 received from orchestrator 105. For example, intermediate results 124 may comprise raw measurement data and measurement service 115 may be configured to apply one or more data processing algorithms to the raw measurement data. The one or more data processing algorithms may include statistical analyses, frequency analyses, electrical analyses, or similar analyses. Additionally, or alternatively, the one or more data processing algorithms may transform and/or convert the initial data into another data format.

In some embodiments, the one or more actions performed by measurement service 115 are based on the type of data included in intermediate results 124. For example, each type and/or format of data received by measurement service 115 may correspond with a particular action. In some embodiments, orchestrator 105 is configured to transmit processing instructions to measurement service 115 along with intermediate results 124. The processing instructions may indicate which one or more of a plurality of available actions provided by measurement service 115 are to be performed on intermediate results 124. Additionally, or alternatively, the processing instructions may indicate the format of results generated by the one or more actions, such as a requested measurement unit.

In some embodiments, measurement service 115 is configured to collect additional measurement data from one or more test tool devices controlled by and/or coupled with measurement service 115 in response to receiving intermediate results 124. Measurement service 114 may acquire the additional measurement data in a similar manner as described above with reference to device server 110. In some embodiments, intermediate results 124 and the additional measurement data acquired by measurement service 115 are combined for additional processing. For example, the one or more actions may include an algorithm that takes as inputs intermediate results 124 and additional data acquired by measurement service 115 to produce an output.

As further illustrated, orchestrator 105 may receive final results 132 from measurement service 115. Final results 132 may include results from performing one or more actions on intermediate results 124 and/or any additional measurement data acquired by measurement service 115. In some embodiments, the higher level function and/or processing performed by orchestrator 105 concludes after receiving final results 132 from measurement service 115. For example, orchestrator 105 may store final results in a database or other memory coupled with orchestrator 105 in association with an identification for a device under test (DUT). As another example, orchestrator 105 may display the final results to a user who requested the results via a user interface.

In some embodiments, orchestrator 105 performs one or more final processes to final results 132 after receiving them from measurement service 115. For example, orchestrator 105 may apply one or more rules to final results 132 to determine a final binning assignment for a DUT. The one or more rules may include upper and/or lower limits, such as those derived from a statistical analysis of other similar DUTs tested prior to the current DUT. Additionally, or alternatively, the one or more rules may include predefined values expected from properly functioning devices, such as logical binary values or physical measurement values.

While described above as including a single device server 110 and measurement service 115, test and measurement systems may include additional services configured by orchestrator 105. For example, orchestrator 105 may configure and receive intermediate results from 1, 5, 10, or more services configured to measure data from one or more electrical components and/or devices. As another example, orchestrator 105 may pass 1, 5, 10, or more intermediate results to a single measurement service, such as measurement service 115, for additional processing. Additionally, or alternatively, orchestrator 105 may pass a first subset of the intermediate results to a first measurement service and a second subset of the intermediate results to a second measurement service. As another example, orchestrator 105 may receive results from a first measurement service configured to process an initial set of results and generate an intermediate set of results. Orchestrator 105 may then pass the intermediate results to a second measurement service, and so on, and so forth, until a final result is generated.

As described in the above configuration, and illustrated in the figure, orchestrator 105 acts as a data broker between each individual service to which it is connected, such as device server 110 and measurement service 115. Stated differently, measurement data from one service is passed to other services for additional processing and/or data acquisition through orchestrator 105 even though orchestrator 105 may not have a direct interest in the intermediate data. Because the data is transmitted twice, once from the source and again to the next processing service, this configuration may lead to larger latencies, higher system processing costs, and increased processing times for each process performed and coordinated by orchestrator 105.

As described further below, test and measurement systems may be configured to reduce the number of measurement data transmissions. By enabling producer and consumer services to communicate directly with each other, instead of through an orchestrator, the number of data transmissions may be reduced. By reducing the number of data transmissions, latency, cost, and processing time may be reduced. Further, using a generic mechanism, services may be able to communicate and initiate data transfers without specialized configurations for each service, or each pair of services between which data may flow.

Figure 2:
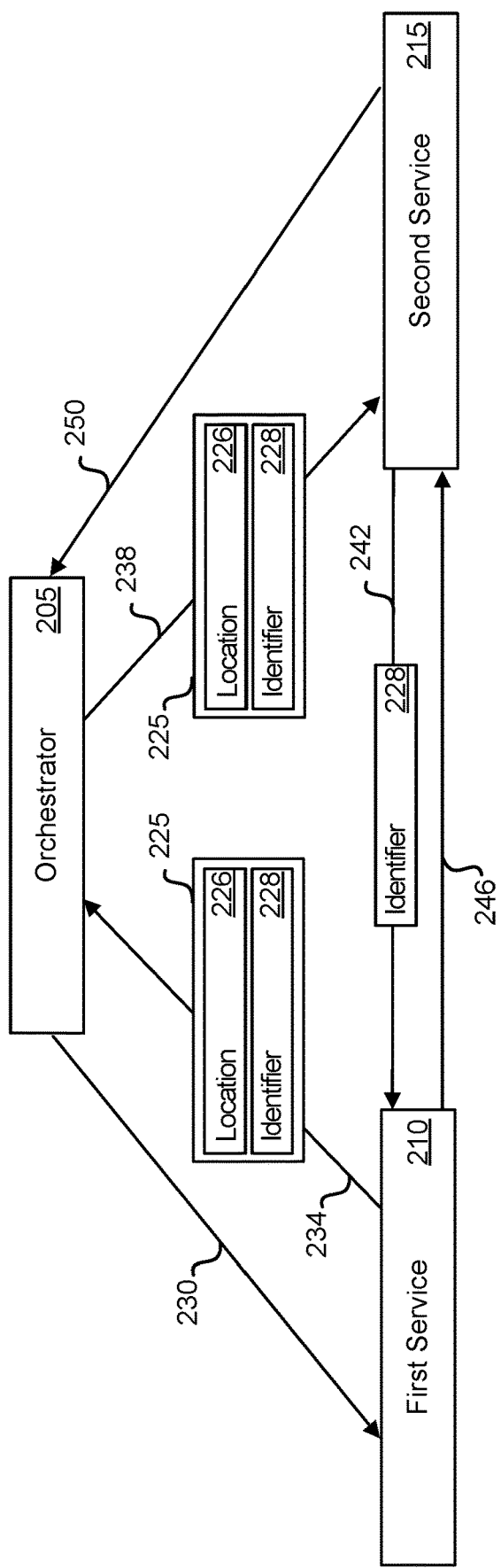
FIG. 2 illustrates a moniker-based test and measurement system according to some embodiments.

FIG. 2 illustrates a moniker-based test and measurement system 200 according to some embodiments. Test and measurement system 200 can include orchestrator 205, first service 210, and second service 215. Orchestrator 205 may be configured to perform some or all of the same functions and/or processes as orchestrator 105 described above. For example, orchestrator 205 may coordinate the flow of data between first service 210 and second service 215 in order to achieve a larger operation and/or result. First service 210 and second service 215 may perform some or all of the same functions and/or processes as device server 110 and measurement service 115 as described above. For example, first service 210 may acquire measurement data for a DUT while second service 215 may perform one or more actions on the measurement data acquired by first service 210.

In some embodiments, orchestrator 205, first service 210, and second service 215 are connected via a communication network. For example, orchestrator 205, first service 210, and second service 215 may be connected via a local area network (LAN) and/or a wide area network (WAN), such as the Internet. In some embodiments, orchestrator 205 is remote to at least one of first service 210 or second service 215. Remote services may be services that do not share the same machine location as another service with which it is communicating. For example, orchestrator 205 may be located in a central headquarters facility and first service 210 and/or second service 215 may be located at individual manufacturing or assembly facilities.

In some embodiments, first service 210 and second service 215 are configured by orchestrator 205 such that first service 210 and second service 215 are able to communicate with each other. For example, first service 210 and second service 215 may be configured to communicate and/or transmit measurement data using a communication API. First service 210 and second service 215 may be configured by orchestrator 205 according to one or more configuration APIs. In some embodiments, first service 210 and/or second service 215 are configured based on respective sets of configuration parameters received from orchestrator 205 via a configuration API. First service 210 and second service 215 may use the parameters to set up the respective services to perform specific operations as requested. For example, as illustrated, orchestrator 205 may use a configuration API to transmit first configuration parameters 230 to first service 210. As another example, orchestrator 205 may use a configuration API to transmit second configuration parameters 238 to second service 215.

Configuration parameters may be parameters used by a service to set up a physical collection of data from DUTs. The configuration parameters and their values may depend on the nature of the measurement to be performed by a service and on the capabilities of the service. Additionally, or alternatively, configuration parameters may specify the type, amount, and/or format of data to be acquired by a particular service. For example, first configuration parameters 230 may indicate a sampling rate at which to take one or more measurements. As another example, first configuration parameters 230 may include one or more input values used to stimulate a measured response from an electrical component. Additionally, or alternatively, configuration parameters may specify the type, amount, and/or format of data that a particular service will receive as well as additional instructions for processing the data and generating an output. For example, second configuration parameters 238 may indicate the type, amount, and/or format of data to be received by second service 215 for additional processing. Further, second configuration parameters 238 may indicate the type of additional processing to perform on the received data, such as one or more statistical analysis, sub-sampling, or other data processing procedures subsequent to the initial data acquisition.

In some embodiments, first service 210 is configured to create a configuration based on first configuration parameters 230. The configuration may include one or more actions, parameters, and/or values used to acquire data. After creating the configuration to acquire measurement data based on first configuration parameters 230, first service 210 may be configured to store the configuration in a memory accessible to first service 210, such as a database or local file system. As an example, the parameters of the configuration created by first service 210 may be stored in association with an identifier key in a tabular data structure, such as a relational database. In some embodiments, the parameters for the configuration created by first service 210 may only be useable by first service 210. First service 210 may be further configured to use the identifier key to locate, recall, and/or execute the configuration to acquire measurement data according to first configuration parameters 230. Additionally, or alternatively, first service 210 may be configured to encode configuration information in an identifier data structure including parameters for the configuration. The information may be encoded based on one or more standards, such as JavaScript Object Notation (JSON), Extensible Markup Language (XML), or a similarly suitable human and/or machine-readable format. First service 210 may be further configured to access the identifier data structure, and/or use the parameters from the identifier data structure, to reconfigure and/or acquire the measurement data as requested by first configuration parameters 230.

In some embodiments, after creating the configuration, first service 210 returns configuration data 234 to orchestrator 205. For example, orchestrator 205 may be configured to receive configuration data 234 from first service 210 in response to first service 210 being configured based on first configuration parameters 230. Configuration data 234 may include one or more pieces of information related to first service 210 and/or the configuration created by first service 210. For example, configuration data 234 may include a location and/or identifier that enables another service, such as a measurement service, as described above in relation to measurement service 115, and referred to herein as second service 215, to locate first service 210 and/or initiate data acquisition by first service 210 based on the configuration. In some embodiments, first service 210 is configured to transmit configuration data 234 to orchestrator 205 in response to a synchronous and/or asynchronous method call, as described above.

In some embodiments, orchestrator 205 may be configured to transmit one or more sets of configuration parameters to first service 210 to create additional configurations. For example, either before or after receiving configuration data 234 associated with a configuration based on first configuration parameters 230, orchestrator 205 may transmit one or more subsequent sets of configuration parameters to first service 210. For each set of configuration parameters, first service 210 may be configured to create a new configuration and corresponding configuration data, and return the configuration data to orchestrator 205. Each set of configuration parameters may be intended to cause first service 210 to create and/or acquire a unique collection of measurement data.

Configuration data 234, and/or any subsequent configuration data created based on subsequent sets of configuration parameters, may include a data moniker object, such as data moniker 225. Data moniker 225 may be a data structure including location 226 and identifier 228. Location 226 may be a data structure including information useable by other services to locate and connect to a service. For example, location 226, created by first service 210, may enable second service 215 to locate and communicate with first service 210. As used herein, locating may include the act of using a service, such as a Dynamic Name Service (DNS) lookup, to find a computer system over a communication network. As another example, location 226 may include an internet protocol (IP) address and port number associated with first service 210. Second service 215 may then use a communication API to locate and/or initiate communications with first service 210.

Identifier 228 may be a data structure including a key or encoded information which can be used to retrieve and/or reconstruct a specified configuration. For example, identifier 228 may include a table index created by first service 210 after creating a configuration based on first configuration parameters 230. After receiving the table index (e.g., from second service 215), first service 210 may access the configuration stored at the table index and use the configuration to acquire the measurement data specified by first configuration parameters 230. As another example, identifier 228 may include one or more configuration parameters created by first service 210 based on first configuration parameters 230. The one or more configuration parameters may configure first service 210 to acquire the measurement data specified by first configuration parameters 230. The one or more configuration parameters included in identifier 228 may not be readily interpretable by second service 215 and may instead only be recognized and/or usable by first service 210. After receiving the one or more configuration parameters included in identifier 228 (e.g., from second service 215), first service 210 may proceed to recall and/or reconstruct the configuration to acquire the measurement data based on the configuration specified by the one or more configuration parameters.

In some embodiments, second service 215 is configured to receive second configuration parameters 238 from orchestrator 205. Second configuration parameters 238 may include data moniker 225 created by first service 210. In some embodiments, second service 215 is configured to transmit identifier 228 to first service 210 after receiving data moniker 225 from orchestrator 205. For example, second service 215 may be configured to parse data moniker 225 for location 226. Second service 215 may then use location 226 to locate and initiate communication with first service 210 via a communication API. After locating and initiating communication with first service 210, second service 215 may then transmit identifier 228 as part of measurement data request 242.

Second service 215 may be configured to initiate communication with, and transmit identifier 228 to, first service 210 in response to receiving data moniker 225 from orchestrator 205. Additionally, or alternatively, second service 215 may wait to initiate communication with, and/or transmit identifier 228 to, first service 210. For example, second service 215 may wait until it receives instructions to begin requesting and/or processing data from first service 210. In some embodiments, second service 215 receives the instructions to begin from orchestrator 205 along with second configuration parameters 238. Alternatively, second service 215 may receive instructions from another service, as described further below.

In some embodiments, first service 210 is configured to initiate the collection of measurement data 246 in response to receiving identifier 228 from second service 215. For example, while first service 210 may create the configuration used to acquire measurement data 246 in response to receiving first configuration parameters 230, first service 210 may not initiate the actual collection of measurement data 246 until identifier 228 is received. Receiving identifier 228 from second service 215 through a particular remote procedure call via an API may cause first service 210 to locate, reconstruct, and/or execute the previously created configuration. In some embodiments, delaying the initiation of measurement acquisition allows the system to be more resilient to latencies that may be involved with configuration and allows an orchestrator, such as orchestrator 205, to not have to manage and/or control the flow of measurement data.

In some embodiments, second configuration parameters 238 include one or more instructions and/or parameters for second service 215. For example, the one or more instructions may indicate one or more actions for second service 215 to perform after using identifier 228 of data moniker 225 to retrieve measurement data 246 from first service 210 as described above. In some embodiments, second configuration parameters 238 configure second service 215 to acquire additional measurement data. For example, second configuration parameters 238 may include one or more additional data monikers with respective locations and identifiers. The additional data monikers may be created by first service 210 for additional configurations created by first service 210 in response to receiving subsequent sets of configuration parameters from orchestrator 205. Additionally, or alternatively, the additional data monikers may be created by other services separate from first service 210. In some embodiments, second configuration parameters 238 may configure second service 215 to directly collect measurements from a DUT.

After receiving measurement data 246 from first service 210, second service 215 may be configured to perform one or more actions on measurement data 246 and generate test results 250. Test results 250 may be generated based on measurement data 246 and the one or more instructions and/or parameters of second configuration parameters 238, as described above. After generating test results 250, second service 215 may transmit test results 250 to orchestrator 205 for final processing. The final processing may include displaying test results 250 to a user of orchestrator 205. Additionally, or alternatively, the final processing may include storing and/or transmitting test results 250 to another service and/or data storage.

In some embodiments, orchestrator 205 may apply one or more rules to test results 250 to determine additional actions or processes to perform on a DUT to which test results 250 are associated. For example, orchestrator 205 may modify first configuration parameters 230 based on test results 250 and transmit the modified configuration parameters to first service 210. Orchestrator 205 may transmit the modified configuration parameters as first service 210 is continuing to acquire measurement data 246 and/or continuing to transmit acquired measurement data 246 to second service 215 in response to receiving identifier 228. After receiving the modified configuration parameters, first service 210 may modify the initial configuration created by first service 210 in response to receiving first configuration parameters 230 such that subsequently acquired measurement data 246 are acquired according to the modified configuration parameters. Additionally, after modifying the initial configuration in response to receiving modified configuration parameters, first service 210 may create a new data moniker, and/or modify data moniker 225, to represent the modified configuration and transmit the new or modified data moniker to orchestrator 205. Modifying configuration parameters in real time as test results are received from second service 215 may enable orchestrator 205 to optimize the parameters of a configuration to meet a system performance target and/or to determine the parameters of the configuration that give a desired result.

As described above, enabling services, such as first service 210 and second service 215, to directly communicate and transfer data may reduce the number of times measurement data are transmitted from service to service compared to other test and measurement system configurations, such as test and measurement system 100 described above. For example, test and measurement system 200 may generate test results 250 by directly transmitting measurement data 246 from first service 210 to second service 215.

In some embodiments, using data monikers, such as data moniker 225, enables test and measurement systems to separate the flow of measurement data from the configuration process. Data monikers may also enable the use of generic methods to connect services together without specific knowledge of one service required by another. For example, while second service 215 described above may be configured to ingest data of a particular type, configuring second service 215 to retrieve the data using a data moniker may allow second service 215 to remain agnostic as to what particular service will be providing the data in the future, as well as how that particular service will acquire the data.

In some embodiments, the ability to isolate service and/or measurement configuration from actual runtime acquisition and/or measurement operations may enable clients, such as orchestrator 205, to be far from the acquisition and/or measurement system without affecting the performance of the measurement system. Additionally, or alternatively, configuring the system as described above may enable the client to configure and monitor multiple systems at the same time without affecting performance or adverse side effects caused by having shared components between systems.

Figure 3:
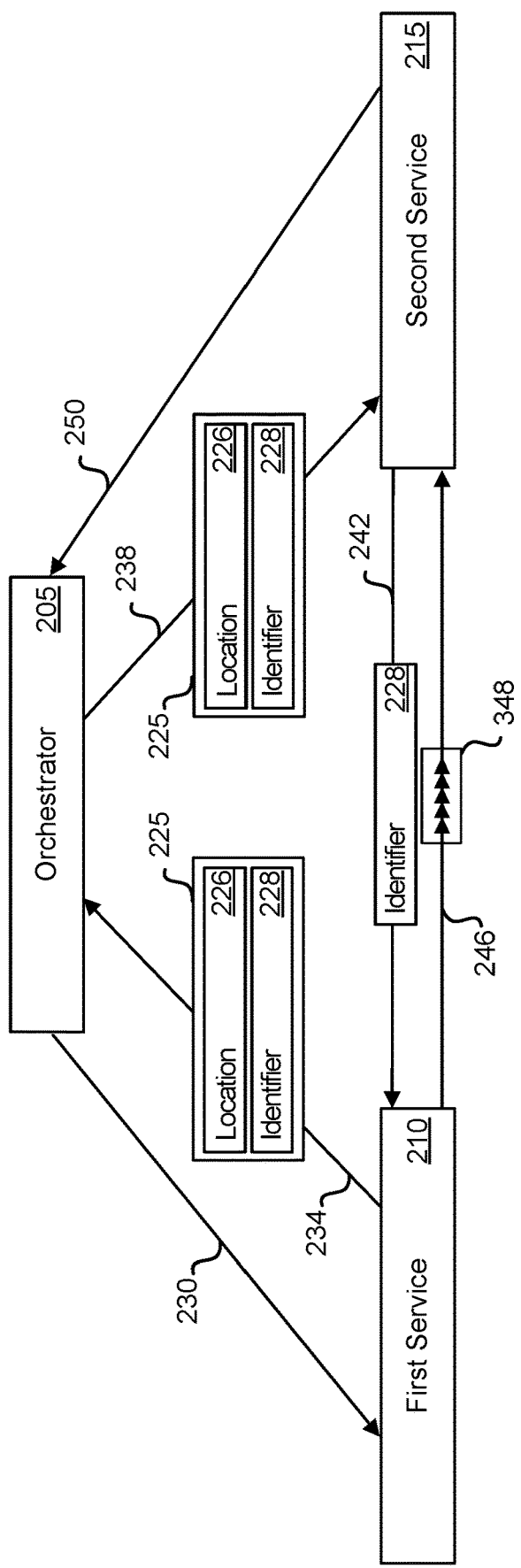
FIG. 3 illustrates the repeated transfer of measurement data within a moniker-based test and measurement system according to some embodiments.

FIG. 3 illustrates the repeated transfer of measurement data within a moniker-based test and measurement system 200 according to some embodiments. In some embodiments, second service 215 is configured to retrieve and/or receive measurement data 246 in more than one batch 348 using data moniker 225 and/or identifier 228. For example, each batch 348 may contain a subset of measurement data 246 acquired by first service 210. Additionally, or alternatively, first service 210 may be configured to acquire measurement data 246 more than once. For example, an oscilloscope may acquire a data reading each time a trigger occurs. Each data reading may then be transmitted to second service 215 after each acquisition, as a collection of data readings, or in sets of data readings until first service 210 stops acquiring data readings.

Figure 4:
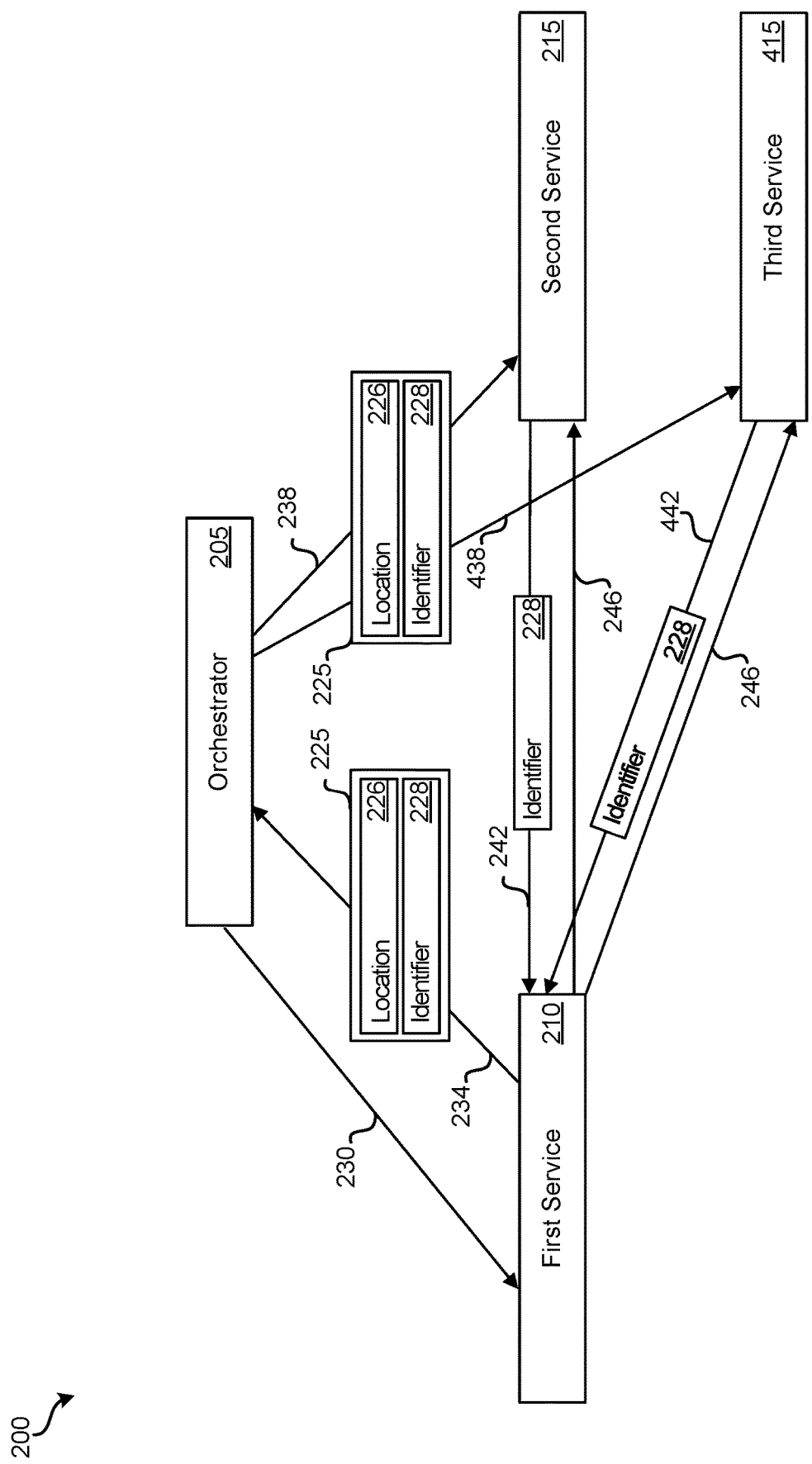
FIG. 4 illustrates the configuration and operation of a moniker-based test and measurement system including multiple consumer services according to some embodiments.

FIG. 4 illustrates the configuration and operation of a moniker-based test and measurement system 200 including multiple consumer services according to some embodiments. As illustrated, test and measurement system 200 may include additional services, such as third service 415, configured to consume and/or process data acquired by first service 210. Third service 415 may be configured to perform processing and/or generate test results in addition to the processing and/or test results from second service 215. For example, second service 215 may be configured to perform a statistical analysis of measurement data 246 and third service 415 may be configured to perform one or more measurements on measurement data 246.

Third service 415 may be configured to retrieve and/or receive data acquired by first service 210 in the same or similar fashion as second service 215. For example, orchestrator 205 may transmit data moniker 225 to third service 415 as part of third configuration parameters 438. Third service 415 may then be configured to locate and/or initiate communication with first service 210 using location 226. After locating and/or initiating communication with first service 210, third service 415 may transmit identifier 228 as part of measurement data request 442 to first service 210. Third service 415 may then be configured to receive measurement data 246 from first service 210.

In some embodiments, first service 210 is configured based on the number of consumer services, such as second service 215 and third service 415. For example, first configuration parameters 230 may indicate the number of expected services (e.g., two services corresponding to second service 215 and third service 415) that will request measurement data using a particular configuration. First service 210 may then create the configuration based on the number of expected services. First service 210 may store the number of expected services in association with the generated configuration.

In some embodiments, first service 210 is configured to begin acquiring and/or transmitting data until after the expected number of services have initiated communication with, and/or transmitted identifier 228 to, first service 210. For example, after second service 215 transmits identifier 228 to first service 210, first service 210 may access the previously generated configuration and determine that one or more additional services, such as third service 415, are expected to receive data acquired according to the configuration. Based on this determination, first service 210 may wait to receive identifier 228 from third service 415 before acquiring and/or transmitting measurement data 246 to second service 215. Once identifier 228 is received from third service 415, first service 210 may begin acquiring data based on the configuration and transmitting measurement data 246 to each of second service 215 and third service 415.

Figure 5:
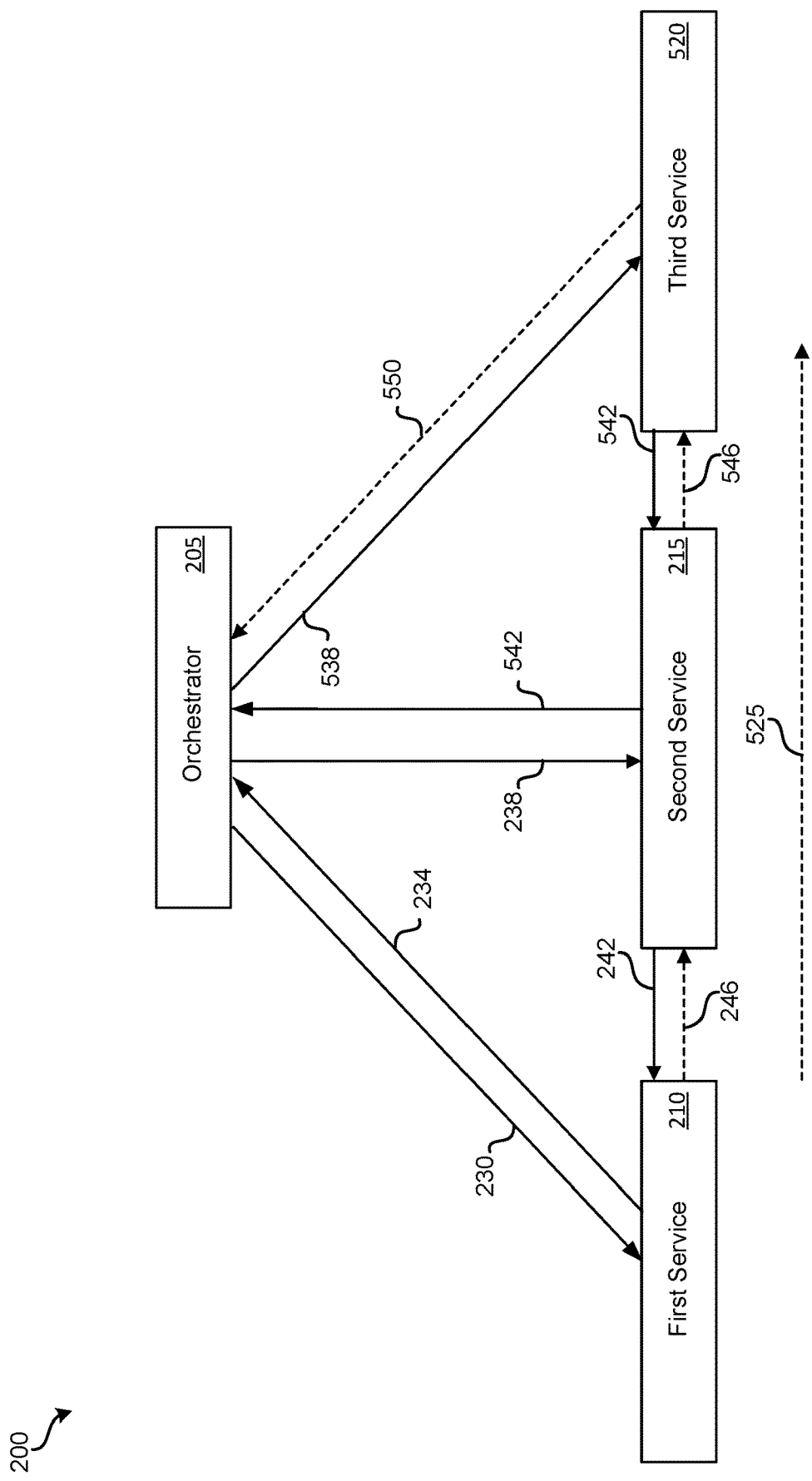
FIG. 5 illustrates the configuration and operation of a moniker-based test and measurement system including a pipeline of measurement services according to some embodiments.

FIG. 5 illustrates the configuration and operation of a moniker-based test and measurement system 200 including a pipeline of measurement services according to some embodiments. In some embodiments, test and measurement system 200 may include a pipeline of services. The pipeline of services may include first service 210, second service 215, and third service 520. The pipeline of services may be configured to achieve a particular data flow 525 from an initial source of data, to a final test result based on data dependencies and/or the relative order of operations performed by each individual service. For example, third service 520 may be configured to generate a test result from one or more types of data acquired and/or generated by second service 215. Second service 215 may in turn be configured to generate the one or more types of data inputs used by third service 520 from first service 210.

In some embodiments, orchestrator 205 configures each of first service 210, second service 215, and third service 520 in the same or similar fashion as described above. For example, orchestrator 205 may transmit first configuration parameters to first service 210 and receive configuration data 234 in return. Configuration data 234 may include a data moniker, such as data moniker 225 described above. Orchestrator 205 may then transmit second configuration parameters 238 to second service 215 and receive second configuration data 542 in return. Second configuration data 542 may include a second data moniker corresponding to a configuration created by second service 215 based on second configuration parameters 238. Orchestrator 205 may then transmit third configuration parameters 538 to third service 520. Third configuration parameters 538 may include the second data moniker generated by second service 215.

In some embodiments, the service configured to produce the test result desired by orchestrator 205 may be configured last. For example, third service 520 may be configured to generate test result 550 and transmit it to orchestrator 205. Because third service 520 may use intermediate test results 546 to generate test result 550, and therefore need the second moniker from second service 215, third service 520 may be configured by orchestrator 205 after orchestrator 205 receives second configuration data 542, including the second moniker, from second service 215.

In some embodiments, the service configured to produce the test result desired by orchestrator 205 receives the initial instructions to begin acquiring and/or processing the data. For example, once each of first service 210, second service 215, and third service 520 have been configured with respective configuration parameters, and the respective data monikers have been passed to the subsequent service, third service 520 may receive instructions to begin acquiring and/or processing data. After receiving the instructions, third service 520 may locate and/or initiate communication with second service 215 using the second data moniker created by second service 215 and passed to third service 520 by orchestrator 205. Third service 520 may then proceed to transmit an identifier from the second data moniker to second service 215.

Upon receiving the identifier from the second data moniker, second service 215 may access and/or recreate the configuration initially created based on second configuration parameters 238. This may include accessing the first data moniker created by first service 210 and passed to second service 215 from orchestrator 205 in the second configuration parameters. Using the first data moniker, second service 215 may locate and/or initiate communication with first service 210. Second service 215 may then proceed to transmit an identifier from the first data moniker to first service 210.

Upon receiving the identifier from the first data moniker, first service 210 may access and/or recreate the configuration initially created by first service 210 based on first configuration parameters 230. First service 210 may then begin acquiring and/or transmitting measurement data 246 to second service 215 according to the configuration. Upon receiving measurement data 246, second service 215 may begin processing measurement data 246 according to the configuration created based on second configuration parameters 238 to generate intermediate test result 546. Second service 215 may then transmit intermediate test result 546 to third service 520. Upon receiving intermediate test result 546, third service 520 may begin processing intermediate test result 546 according to the configuration created based on third configuration parameters 538 to generate test result 550. Third service 520 may then transmit test result 550 to orchestrator 205 for display to a user and/or for additional processing, as described above.

In some embodiments, the pipeline can be augmented with services that provide caching or buffering of data. Augmenting with services that provide caching or buffering of data may enable further decoupling of the measurement services included in a test and measurement system. In some embodiments, measurement services are multiplexed to enable test and measurement systems to scale with a multitude of measurement services.

Figure 6:
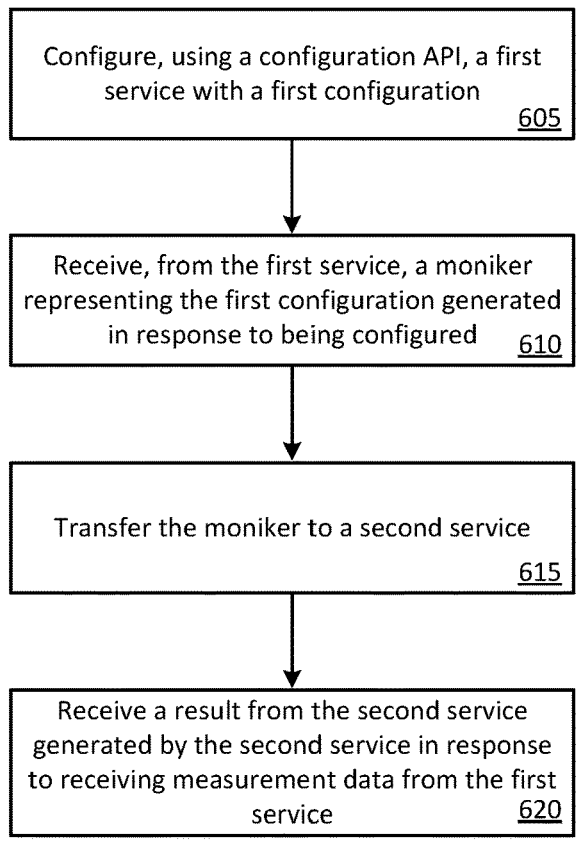
FIG. 6 illustrates an exemplary method of orchestrating measurements in a measurement system according to some embodiments.

Various methods may be performed using the system and configurations detailed in relation to FIGS. 1-5. FIG. 6 illustrates an exemplary method of orchestrating measurements in a measurement system according to some embodiments. In some embodiments, method 600 is performed by one or more services of a test and measurement system, such as test and measurement system 200 as described above. For example, orchestrator 205 may perform some or all of method 600. At block 605, a first service is configured with a first configuration using a configuration API. The first service may be configured by an orchestrator, such as orchestrator 205 as described above. The first service may be the same or operate in a similar manner as first service 210 described above. For example, the first service may be configurable to acquire measurement data such as from a test tool device and/or data storage. Configuring the first service may include transmitting configuration parameters to the first service indicating what data to acquire, how to acquire the data, and/or how to format the acquired data.

At block 610, a moniker representing the first configuration is received from the first service in response to being configured. The moniker representing the first configuration may be structured in the same way and/or include similar data as data moniker 225 described above. For example, the moniker may include a location of the first service. The location of the first service may include at least one of a DNS lookup, a raw IP address, a protocol address, or a service directory. As another example, the moniker may include an identifier of the first configuration. The identifier of the first configuration may include parameters of the first configuration as described above. Additionally, or alternatively, the identifier of the first configuration may include a location of the first configuration in the first service as described above.

At block 615, the moniker is transferred to a second service. The second service may be the same or operate in a similar manner as second service 215 described above. For example, the second service may be configurable to consume the measurement data from the first service and produce a result. In some embodiments, the second service is unable to configure the first service. In some embodiments, one or more configuration parameters are transferred to the second service with the moniker. The one or more configuration parameters may indicate how the second service is intended to produce the result and/or in what format to produce the result.

At block 620, a result is received from the second service generated by the second service in response to receiving measurement data from the first service. In some embodiments, the second service is configured to establish communication with the first service based on the location of the first service from the moniker. The first service may then receive the identifier of the first configuration from the second service via the established communication. In response to receiving the identifier, the first service may be configured to acquire the measurement data using the first configuration and transmit the measurement data to the second service. The result may then be generated by the second service in response to receiving the measurement data from the first service.

It should be appreciated that the specific steps illustrated in FIG. 6 provide a particular method of orchestrating measurements in a measurement system according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
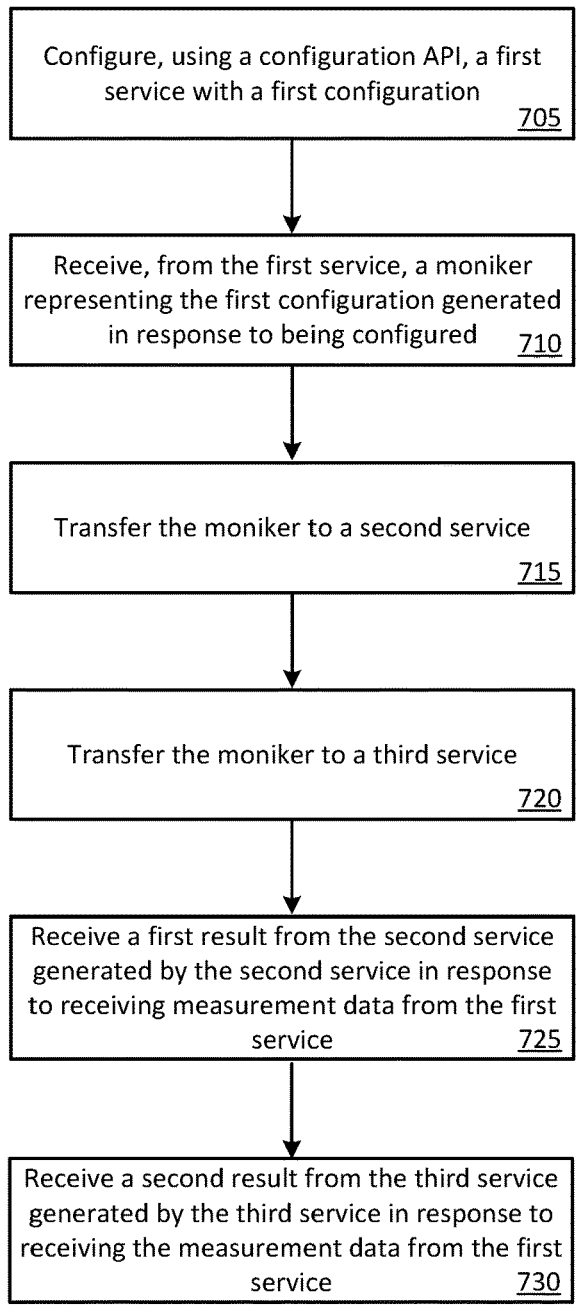
FIG. 7 illustrates an exemplary method of orchestrating measurements from multiple measurement consuming services in a measurement system according to some embodiments.

FIG. 7 illustrates an exemplary method of orchestrating measurements from multiple measurement consuming services in a measurement system according to some embodiments. In some embodiments, method 700 is performed by one or more services of a test and measurement system, such as test and measurement system 200 as described above. For example, orchestrator 205 may perform some or all of method 700. At block 705, a first service is configured with a first configuration using a configuration API. The first service may be configured by an orchestrator, such as orchestrator 205 as described above. The first service may be the same or operate in a similar manner as first service 210 described above. For example, the first service may be configurable to acquire data such as from a test tool device and/or data storage. Configuring the first service may include transmitting configuration parameters to the first service indicating what data to acquire, how to acquire the data, and/or how to format the acquired data.

At block 710, a moniker representing the first configuration generated by the first service is received from the first service. The moniker representing the first configuration may be structured in the same way and/or include similar data as data moniker 225 described above. For example, the moniker may include a location of the first service. The location of the first service may include at least one of a DNS lookup, a raw IP address, a protocol address, or a service directory. As another example, the moniker may include an identifier of the first configuration. The identifier of the first configuration may include parameters of the first configuration as described above. Additionally, or alternatively, the identifier of the first configuration may include a location of the first configuration in the first service as described above.

At block 715, the moniker is transferred to a second service. The second service may be the same or operate in a similar manner as second service 215 described above. For example, the second service may be configurable to consume the measurement data from the first service and produce a first result. In some embodiments, one or more configuration parameters are transferred to the second service with the moniker. The one or more configuration parameters may indicate how the second service is intended to produce the first result and/or in what format to produce the first result.

At block 720, the moniker is transferred to a third service. The third service may be the same or operate in a similar manner as third service 415 described above. For example, the third service may be configurable to consume the measurement data from the first service and produce a second result. In some embodiments, one or more configuration parameters are transferred to the third service with the moniker. The one or more configuration parameters may indicate how the third service is intended to produce the second result and/or in what format to produce the second result.

At block 725, a first result is received from the second service that was generated by the second service in response to receiving measurement data from the first service. In some embodiments, the second service is configured to establish communication with the first service based on the location of the first service from the moniker. The first service may then receive the identifier of the first configuration from the second service via the established communication. In response to receiving the identifier, the first service may be configured to acquire the measurement data using the first configuration and transmit the measurement data to the second service. The first result may then be generated by the second service in response to receiving the measurement data from the first service.

At block 730, a second result is received from the third service that was generated by the third service in response to receiving the measurement data from the first service. In some embodiments, the third service is configured to establish communication with the first service based on the location of the first service from the moniker. The first service may then receive the identifier of the first configuration from the third service via the established communication. In response to receiving the identifier, the first service may be configured to acquire the measurement data using the first configuration and/or transmit the previously acquired measurement data to the third service. The second result may then be generated by the third service in response to receiving the measurement data from the first service.

It should be appreciated that the specific steps illustrated in FIG. 7 provide a particular method of orchestrating measurements from multiple measurement consuming services in a measurement system according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
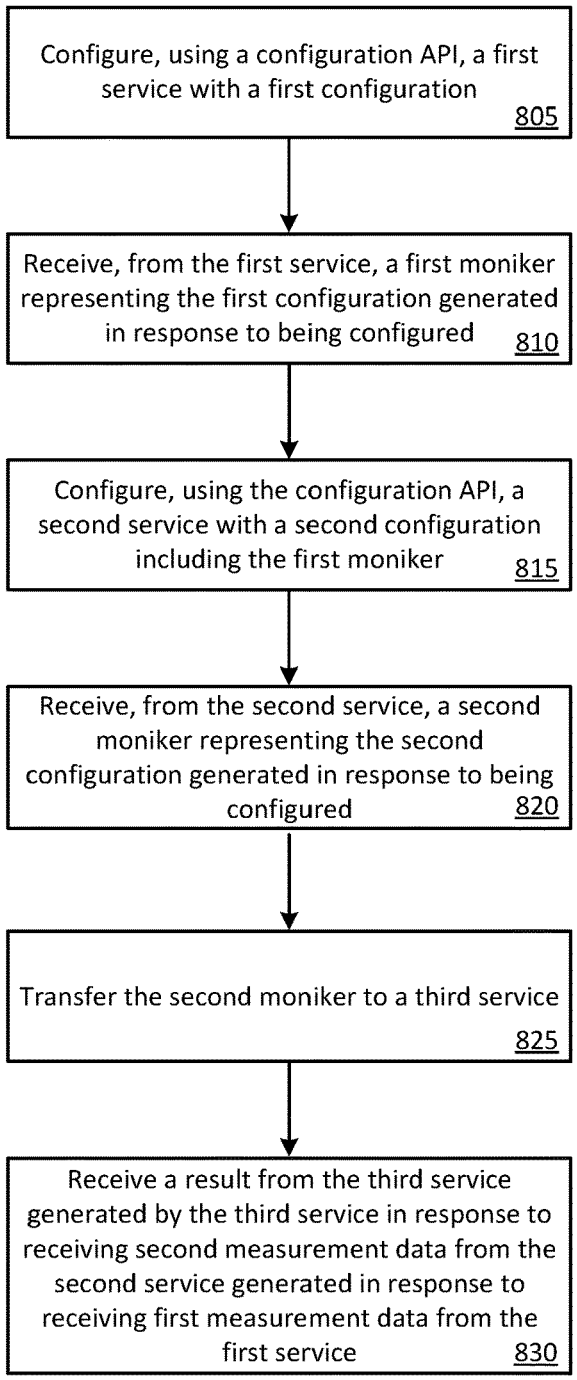
FIG. 8 illustrates an exemplary method of orchestrating measurements from a pipeline of measurement services in a measurement system according to some embodiments.

FIG. 8 illustrates an exemplary method of orchestrating measurements from a pipeline of measurement services in a measurement system according to some embodiments. In some embodiments, method 800 is performed by one or more services of a test and measurement system, such as test and measurement system 200 as described above. For example, orchestrator 205 may perform some or all of method 800. At block 805, a first service is configured with a first configuration using a configuration API. The first service may be configured by an orchestrator, such as orchestrator 205 as described above. The first service may be the same or operate in a similar manner as first service 210 described above. For example, the first service may be configurable to acquire data such as from a test tool device and/or data storage. Configuring the first service may include transmitting configuration parameters to the first service indicating what data to acquire, how to acquire the data, and/or how to format the acquired data.

At block 810, a first moniker representing the first configuration generated by the first service is received from the first service. The first moniker representing the first configuration may be structured in the same way and/or include similar data as data moniker 225 described above. For example, the first moniker may include a location of the first service. The location of the first service may include at least one of a DNS lookup, a raw IP address, a protocol address, or a service directory. As another example, the first moniker may include an identifier of the first configuration. The identifier of the first configuration may include parameters of the first configuration as described above. Additionally, or alternatively, the identifier of the first configuration may include a location of the first configuration in the first service as described above.

At block 815, a second service is configured with a second configuration including the first moniker using the configuration API. The second service may be configured by the same, or a similar orchestrator that configured the first service, such as orchestrator 205 as described above. The second service may be the same or operate in a similar manner as second service 215 described above. For example, the second service may be configurable to retrieve data from the first service and process the data to generate a test result. Configuring the second service may include transmitting configuration parameters along with the first moniker to the second service indicating what test results to generate, how to generate the test results, and/or how to format the generated test results.

At block 820, a second moniker representing the second configuration generated by the second service is received from the second service. The second moniker representing the second configuration may be structured in the same way and/or include similar data as data moniker 225 described above. For example, the second moniker may include a location of the second service. The location of the second service may include at least one of a DNS lookup, a raw IP address, a protocol address, or a service directory. As another example, the second moniker may include an identifier of the second configuration. The identifier of the second configuration may include parameters of the second configuration as described above. Additionally, or alternatively, the identifier of the second configuration may include a location of the second configuration in the second service as described above.

At block 825, the second moniker is transferred to a third service. The third service may be the same or operate in a similar manner as third service 520 described above. For example, the third service may be configurable to consume the measurement data from the second service and produce a result. In some embodiments, one or more configuration parameters are transferred to the third service with the second moniker. The one or more configuration parameters may indicate how the third service is intended to produce the result and/or in what format to produce the result.

At block 830, a result is received from the third service that was generated by the third service in response to receiving second measurement data from the second service that was generated in response to receiving first measurement data from the first service. In some embodiments, the third service is configured to establish communication with the second service based on the location of the second service from the second moniker. The second service may then receive the identifier of the second configuration from the third service via the established communication. In response to receiving the identifier, the second service may be configured to acquire the first measurement data from the first service using the location and identifier of the first moniker. After receiving the first measurement data from the first service, the second service may process the measurement data and generate the second measurement data based on the second configuration. The second service may then transmit the second measurement data to the third service. The result may then be generated by the third service in response to receiving the second measurement data from the second service.

It should be appreciated that the specific steps illustrated in FIG. 8 provide a particular method of orchestrating measurements from a pipeline of measurement services in a measurement system according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
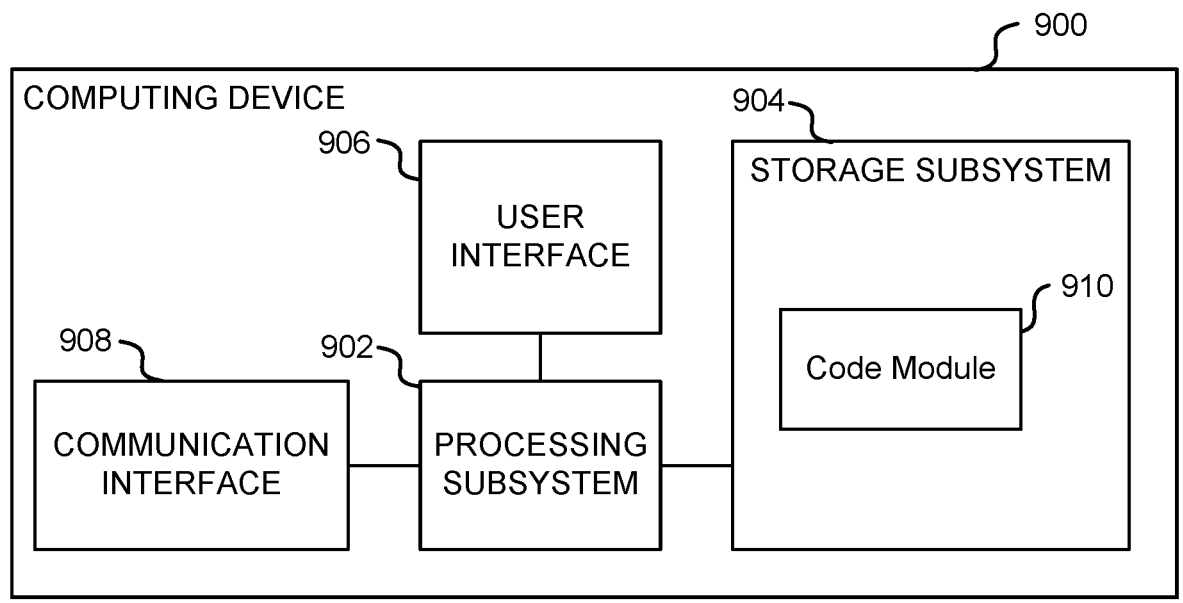
FIG. 9 illustrates a block diagram of an embodiment of a computer system according to some embodiments.

In some embodiments, one or more services of a test and measurement system, such as test and measurement system are implemented on a computing device. FIG. 9 illustrates a block diagram of an embodiment of a computing device 900. Computing device 900 can implement some or all functions, behaviors, and/or capabilities described above that would use electronic storage or processing, as well as other functions, behaviors, or capabilities not expressly described. Computing device 900 includes a processing subsystem 902, a storage subsystem 904, a user interface 906, and/or a communication interface 908. Computing device 900 can also include other components (not explicitly shown) such as a battery, power controllers, and other components operable to provide various enhanced capabilities. In various embodiments, computing device 900 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 904 can be implemented using a local storage and/or removable storage medium, e.g., using disk, flash memory (e.g., secure digital card, universal serial bus flash drive), or any other non-transitory storage medium, or a combination of media, and can include volatile and/or nonvolatile storage media. Local storage can include random access memory (RAM), including dynamic RAM (DRAM), static RAM (SRAM), or battery backed up RAM. In some embodiments, storage subsystem 904 can store one or more applications and/or operating system programs to be executed by processing subsystem 902, including programs to implement some or all operations described above that would be performed using a computer. For example, storage subsystem 904 can store one or more code modules 910 for implementing one or more method steps described above.

A firmware and/or software implementation may be implemented with modules (e.g., procedures, functions, and so on). A machine-readable medium tangibly embodying instructions may be used in implementing methodologies described herein. Code modules 910 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module 910) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementations of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 910 may comprise sets of instructions (codes) embodied on a computer-readable medium that directs a processor of a computing device 900 to perform corresponding actions. The instructions may be configured to run in sequential order, in parallel (such as under different processing threads), or in a combination thereof. After loading a code module 910 on a general purpose computer system, the general purpose computer is transformed into a special purpose computer system.

Computer programs incorporating various features described herein (e.g., in one or more code modules 910) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 904 can also store information useful for establishing network connections using the communication interface 908.

User interface 906 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 906 to invoke the functionality of computing device 900 and can view and/or hear output from computing device 900 via output devices of user interface 906. For some embodiments, the user interface 906 might not be present (e.g., for a process using an ASIC).

Processing subsystem 902 can be implemented as one or more processors (e.g., integrated circuits, one or more single core or multi core microprocessors, microcontrollers, central processing unit, graphics processing unit, etc.). In operation, processing subsystem 902 can control the operation of computing device 900. In some embodiments, processing subsystem 902 can execute a variety of programs in response to program code and can maintain multiple concurrently executing programs or processes. At a given time, some or all of a program code to be executed can reside in processing subsystem 902 and/or in storage media, such as storage subsystem 904. Through programming, processing subsystem 902 can provide various functionality for computing device 900. Processing subsystem 902 can also execute other programs to control other functions of computing device 900, including programs that may be stored in storage subsystem 904.

Communication interface 908 can provide voice and/or data communication capability for computing device 900. In some embodiments, communication interface 908 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, near-field communications (NFC), etc.), other components, or combinations of technologies. In some embodiments, communication interface 908 can provide wired connectivity (e.g., universal serial bus, Ethernet, universal asynchronous receiver/transmitter, etc.) in addition to, or in lieu of, a wireless interface. Communication interface 908 can be implemented using a combination of hardware (e.g., driver circuits, antennas, modulators/demodulators, encoders/decoders, and other analog and/or digital signal processing circuits) and software components. In some embodiments, communication interface 908 can support multiple communication channels concurrently. In some embodiments, the communication interface 908 is not used.

It will be appreciated that computing device 900 is illustrative and that variations and modifications are possible. A computing device can have various functionality not specifically described (e.g., voice communication via cellular telephone networks) and can include components appropriate to such functionality.

Further, while the computing device 900 is described with reference to particular blocks, it is to be understood that these blocks are defined for convenience of description and are not intended to imply a particular physical arrangement of component parts. For example, the processing subsystem 902, the storage subsystem 904, the user interface 906, and/or the communication interface 908 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 900.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method of orchestrating measurements in a measurement system comprising a first service for acquiring measurement data, a second service for consuming the measurement data and producing a result, and an orchestrator for configuring the measurement system, the computer-implemented method comprising:
 configuring, by the orchestrator and using a configuration Application Programming Interface (API), the first service to acquire measurement data according to a first configuration;
 receiving, by the orchestrator from the first service, a moniker that represents the first configuration, wherein the moniker is generated by the first service in response to being configured by the orchestrator, the moniker comprising:
  a location of the first service configured to acquire measurement data, wherein the second service is configured to establish a communication with the first service based on the location of the first service; and
  an identifier of the first configuration, wherein the first service is configured to acquire the measurement data using the first configuration and transmit the measurement data to the second service in response to receiving the identifier from the second service via the communication;
 transferring the moniker to the second service; and
 receiving the result from the second service, wherein the result is generated by the second service in response to receiving the measurement data from the first service.

2. The computer-implemented method of claim 1, wherein the measurement system is distributed across compute nodes connected via a communication network.

3. The computer-implemented method of claim 1, wherein the orchestrator is remote to at least one of the first service or the second service.

4. The computer-implemented method of claim 1, wherein receiving the identifier from the second service via the communication is independent of the first service being configured by the orchestrator.

5. The computer-implemented method of claim 1, wherein the identifier of the first configuration includes parameters of the first configuration.

6. The computer-implemented method of claim 1, wherein the identifier of the first configuration includes a location of the first configuration in the first service.

7. The computer-implemented method of claim 1, wherein at least one of acquiring the measurement data or transmitting the measurement data comprises at least one of acquiring a subset of data in more than one batch using the identifier of the first configuration from the moniker or transmitting the subset of data in more than one batch using the identifier of the first configuration from the moniker.

8. The computer-implemented method of claim 1, wherein the location includes at least one of a Domain Name Service (DNS) lookup, a raw Internet Protocol (IP) address, a protocol address, or a service directory.

9. The computer-implemented method of claim 1, wherein the measurement system comprises a plurality of services including the second service and at least one more service for consuming the measurement data and producing at least one more result, configuring the first service includes providing information about the plurality of services to the first service, and the computer-implemented method further comprises:
 transferring the moniker from the orchestrator to the at least one more service; and
 receiving the at least one more result from the at least one more service, wherein the at least one more result is generated by the at least one more service in response to receiving the measurement data from the first service using the location and the identifier of the moniker.

10. The computer-implemented method of claim 1, wherein the measurement system further comprises an initial service for acquiring initial measurement data, the first configuration comprises an initial moniker generated by the initial service in response to being configured by the orchestrator, and the first service acquires the measurement data in response to receiving the initial measurement data from the initial service using the initial moniker.

11. The computer-implemented method of claim 1, wherein the second service is unable to configure the first service.

12. The computer-implemented method of claim 1, wherein the second service is unable to establish the communication with the first service without the location of the first service from the moniker.

13. The computer-implemented method of claim 1, further comprising modifying, by the orchestrator and based on the result received from the second service, the first configuration such that the first service acquires subsequent measurement data using a modified first configuration.

14. A test and measurement system, comprising:
 a first service that acquires measurement data;
 a second service that generates a result in response to receiving the measurement data from the first service; and
 an orchestrator comprising one or more processors in communication with the first service and the second service, wherein the orchestrator performs operations comprising:
  configuring the first service to acquire the measurement data according to a first configuration in response to receiving an identifier of the first configuration;
  receiving a moniker generated by the first service in response to being configured with the first configuration, wherein the moniker comprises a location of the first service and the identifier of the first configuration;
  transferring the moniker to the second service; and
  receiving the result generated by the second service in response to using the transferred moniker to receive and consume the measurement data from the first service.

15. The test and measurement system of claim 14, further comprising a communication network connecting the first service, the second service, and the orchestrator, wherein the first service, the second service, and the orchestrator are each installed on separate compute nodes.

16. The test and measurement system of claim 14, further comprising a test tool device controlled by the first service and from which the first service acquires the measurement data using the first configuration.

17. The test and measurement system of claim 14, further comprising a third service that generates a second result in response to receiving the measurement data from the first service, wherein the operations performed by the orchestrator further comprise:

transferring the moniker to the third service; and receiving the second result generated by the third service in response to using the moniker to receive the measurement data from the first service.

18. The test and measurement system of claim 14, further comprising a third service that acquires initial measurement data based on which the first service acquires the measurement data, wherein the operations performed by the orchestrator further comprise:

configuring the third service to acquire the initial measurement data according to an initial configuration and transmit the initial measurement data to the first service in response to receiving an initial identifier of the initial configuration from the first service; and receiving an initial moniker generated by the third service in response to being configured with the initial configuration, wherein the initial moniker is transferred to the first service as part of configuring the first service.

19. One or more non-transitory computer-readable storage media storing instructions that, upon execution on a computer system, cause the computer system to perform operations comprising:

configuring a first service to acquire measurement data according to a first configuration in response to receiving an identifier of the first configuration;

receiving a moniker generated by the first service in response to being configured with the first configuration, wherein the moniker comprises a location of the first service and the identifier of the first configuration;

transferring the moniker to a second service; and receiving a result generated by the second service in response to using the transferred moniker to receive and consume the measurement data from the first service.

20. The one or more non-transitory computer-readable storage media of claim 19, wherein the operations further comprise:

transferring the moniker to a third service; and receiving a second result generated by the third service in response to using the moniker to receive the measurement data from the first service.

* * * * *